United States Patent [19]

D'Muhala et al.

[11] Patent Number: 5,489,735
[45] Date of Patent: Feb. 6, 1996

[54] DECONTAMINATION COMPOSITION FOR REMOVING NORMS AND METHOD UTILIZING THE SAME

[76] Inventors: Thomas F. D'Muhala, 527 Powell St., Raleigh, N.C. 27606; William H. Wadlin, 3 Mt. Bolus Rd., Chapel Hill, N.C. 27514

[21] Appl. No.: 185,495

[22] Filed: Jan. 24, 1994

[51] Int. Cl.$^6$ ........................................... G21F 9/00
[52] U.S. Cl. ..................... 588/1; 588/13; 588/18; 588/9; 588/17; 376/305; 376/310
[58] Field of Search ................... 588/1, 13, 18, 588/9, 17; 376/305, 310; 976/DIG. 391

[56] References Cited

U.S. PATENT DOCUMENTS

| | | | |
|---|---|---|---|
| 3,244,605 | 4/1966 | Hotchkiss et al. | 204/153 |
| 3,459,646 | 8/1969 | Carlson | 204/153 |
| 3,664,870 | 5/1972 | Oberhofer et al. | 134/3 |
| 3,873,362 | 3/1975 | Mihram et al. | 134/3 |
| 4,193,853 | 3/1980 | Childs et al. | 204/129.95 |
| 4,226,640 | 10/1980 | Bertholdt | 134/3 |
| 4,452,643 | 6/1984 | Martin et al. | 134/3 |
| 4,470,951 | 9/1984 | Bradbury et al. | 376/310 |
| 4,476,047 | 10/1984 | Bonnici et al. | 252/626 |
| 4,512,921 | 4/1985 | Anstine et al. | 252/626 |
| 4,514,270 | 4/1985 | Furutani et al. | 204/151 |
| 4,537,666 | 8/1985 | Murray et al. | 204/129.95 |
| 4,587,043 | 5/1986 | Murray et al. | 252/626 |
| 4,609,757 | 9/1986 | D'Muhala et al. | 546/151 |
| 4,657,596 | 4/1987 | Murray et al. | 134/3 |
| 4,659,512 | 4/1987 | Macedo et al. | 252/629 |
| 4,685,971 | 8/1987 | Murray et al. | 134/2 |
| 4,704,235 | 11/1987 | Arvesen | 252/626 |
| 4,726,907 | 2/1988 | D'Muhala et al. | 252/82 |
| 4,729,855 | 3/1988 | Murray et al. | 252/626 |
| 4,747,954 | 5/1988 | Vaughn et al. | 210/670 |
| 4,775,491 | 10/1988 | D'Muhala et al. | 252/180 |
| 4,792,385 | 12/1988 | Snyder et al. | 204/140 |
| 4,828,790 | 5/1989 | Honda et al. | 376/306 |
| 4,880,559 | 11/1989 | Murray et al. | 252/186.21 |
| 4,913,849 | 4/1990 | Husain | 252/626 |
| 4,973,201 | 11/1990 | Paul et al. | 405/264 |
| 4,980,077 | 12/1990 | Morris et al. | 252/82 |
| 5,032,280 | 7/1991 | Paul et al. | 210/643 |
| 5,085,709 | 2/1992 | Morris et al. | 134/3 |
| 5,111,887 | 5/1992 | Morris et al. | 166/312 |
| 5,133,871 | 7/1992 | Levy | 210/688 |
| 5,154,197 | 10/1992 | Auld et al. | 134/1 |
| 5,196,124 | 3/1993 | Connor et al. | 210/679 |
| 5,207,532 | 5/1993 | Mason et al. | 405/128 |
| 5,342,449 | 8/1994 | Holbein et al. | 134/2 |

OTHER PUBLICATIONS

Gray, *Radioactive materials could pose problems for the gas industry*, Oil & Gass Journal (1990).

*Primary Examiner*—Donald P. Walsh
*Assistant Examiner*—Meena Chelliah
*Attorney, Agent, or Firm*—Bell, Seltzer, Park & Gibson

[57] ABSTRACT

A decontamination composition comprises 40 to 60 percent of a compound selected from the group consisting of oxalic acid, alkali metal and ammonium salts of oxalic acid and mixtures thereof; 5 to 20 percent of a compound selected from the group consisting of citric acid, alkali metal and ammonium salts of citric acid and mixtures thereof; 20 to 40 percent of a compound selected from the group consisting of polyaminocarboxylic acid, alkali metal and ammonium salts of polyaminocarboxylic acid and the combination of a polyaminocarboxylic acid and a neutralizing compound, and mixtures thereof; 0 to 2 percent of a nonionic surfactant; about 0 to 2 percent of a dispersant; and about 0 to 2 percent of a corrosion inhibitor. The present invention also relates to a method of decontaminating a surface whereby contaminants in the form of NORMs are removed therefrom.

15 Claims, 2 Drawing Sheets

DECONTAMINATION COMPOSITION FOR REMOVING NORMS AND METHOD UTILIZING THE SAME

FIELD OF THE INVENTION

This invention relates to a decontamination composition, and more particularly to a composition suitable for decontaminating surfaces contaminated with naturally occurring radioactive materials (NORMs).

BACKGROUND OF THE INVENTION

Naturally occurring radioactive material (hereinafter "NORM") is present in varying concentrations in groundwater and the like, in water supply wells, oil production wells, gas production wells, and as byproducts in mining operations. In the oil field, NORM is the result of material that has been extracted from the producing zone and is deposited on the equipment in the form of solids, films, pipe scale, sediment, and the like. The radioactive material is typically radium 226, radium 228, radon 222, thorium 232, uranium 235, uranium 238, lead 210, polonium 210, and other naturally occurring radionuclides. Typically these radionuclides are α, β and often γ emitters which have a long half life. Such radionuclides are believed to be associated with toxic and carcinogenic effects. Strict health-based limits thereon have been enacted or are under consideration.

For example, the process equipment used in various petrochemical plants, refineries, and the like, and associated piping is exposed to high levels of NORM. The disposal of equipment having a high level of NORM has come under increased scrutiny, particularly in oil-producing states such as Louisiana and Texas. Thus, many companies are stockpiling equipment which will need to either be cleaned for reuse or decontaminated for disposal. Thus, currently the most common practice other than stockpiling is to ship the equipment to a radioactive waste facility which have their own environmental problems. There are also several costly mechanical methods on the market for removing NORM. These include ice, sponge, or carbon dioxide blasting. These methods have limitations in that these methods are more applicable to pipe scale and other solid forms of NORM as compared to NORM deposited in solution or as a film which adheres to metal surfaces and is difficult to remove.

Methods are known to remove radioactive materials from surfaces such as those found in nuclear reactors. For example, U.S. Pat. No. 4,537,666 to Murray et al. describes the typical system as treating the surfaces with an oxidizing solution, such as one containing an alkaline permanganate. This is followed by treatment with a decontamination solution which is an aqueous solution of a chelate, such as ethylenediaminetetraacetic acid (EDTA), and a solubilizing agent, such as a mixture of oxalic acid and citric acid. The chelate forms a complex with the metal ions from the deposits and solubilizes them, and, thus prevents them from precipitating out of the solution at another location in the cooling system. The decontamination solution is circulated between the cooling system and a cation exchange resin. The chelated metal ions are deposited on the cation exchange resin, freeing the chelate to solubilize additional metal ions in the deposit.

The difficulty with this decontamination process, according to Murray et al., is that both the chelates and the cation exchange resin complete for the metal ions. As a result, the metal ions do not readily leave the chelate and attach themselves to the ion exchange column. This means that long resin contact times are required, and that the ion exchange column effluent may contain relatively high metal ion concentrations. Murray et al. proposes to remove the metal ions by passing the decontamination solution through a porous DC electrode.

Other exemplary methods for removing nonnaturally occurring radioactive materials are proposed in U.S. Pat. Nos. 4,704,235 to Arvesen; 4,729,855 to Murray et al.; 4,792,385 to Snyder et al.; and 5,111,887 to Morris et al.

Despite the general availability of methods of removing naturally occurring and nonnaturally occurring radioactive materials, there continues to be a need for removing NORMs from surfaces exposed to the same, and particularly NORM deposited as a solution or film and adhered to surfaces.

SUMMARY OF THE INVENTION

With the foregoing in mind, it is an object of this invention to provide a decontamination composition and a method for decontaminating a surface contaminated with naturally occurring radioactive material (NORM). There are generally three types of NORM contaminants. One is radioactive scale which contains uranium, thorium, radium, and associated decay products from the production of oil and associated brines contaminated with NORM. The radioactivity in the scale originates principally from radium, which coprecipitates with barium and strontium sulfate. Another type is NORM-contaminated film, coating, or plating which can form from natural gas production or processing. Another type is NORM-contaminated sludge in pipelines, processing plants, storage tanks and delivery facilities, pigging operations, and gas lines and other filter assemblies. These films often contain radon and its decay products (i.e., polonium 210, bismuth 210, and lead 210). The film, coating, and plating forms are often more difficult to remove as compared to scale, and moreover the above-described mechanical methods are typically ineffective.

These and other objects, features, and advantages of the invention are provided by the decontamination composition of the present invention. The composition comprises 40 to 60 percent of a compound selected from the group consisting of oxalic acid, alkali metal and ammonium salts of oxalic acid and mixtures thereof; 5 to 20 percent of a compound selected from the group consisting of citric acid, alkali metal and ammonium salts of citric acid and mixtures thereof; 20 to 40 percent of a compound selected from the group consisting of polyaminocarboxylic acid, alkali metal and ammonium salts of polyaminocarboxylic acid, and the combination of a polyaminocarboxylic acid with a neutralizing compound, and mixtures thereof; 0 to 2 percent of a nonionic surfactant, 0 to 2 percent of a dispersant; and 0 to 2 percent of a corrosion inhibitor.

The present invention also relates to a method of decontaminating a surface whereby contaminants in the form of NORMs are removed therefrom. The method comprises contacting the surface (e.g., a metal surface) with a decontamination composition comprising about 40 to 60 percent of a compound selected from the group consisting of oxalic acid, alkali metal and ammonium salts of oxalic acid and mixtures thereof; about 5 to 20 percent of a compound selected from the group consisting of citric acid, alkali metal and ammonium salts of citric acid and mixtures thereof; about 20 to 40 percent of a compound selected from the group consisting of polyaminocarboxylic acid, alkali metal and ammonium salts of polyaminocarboxylic acid, and the combination of a polyaminocarboxylic acid with a neutralizing compound, and mixtures thereof; about 0 to 2 percent of a nonionic surfactant; about 0 to 2 percent of a dispersant, and 0 to 2 percent of a corrosion inhibitor.

DETAILED DESCRIPTION OF THE INVENTION

Figure 1:
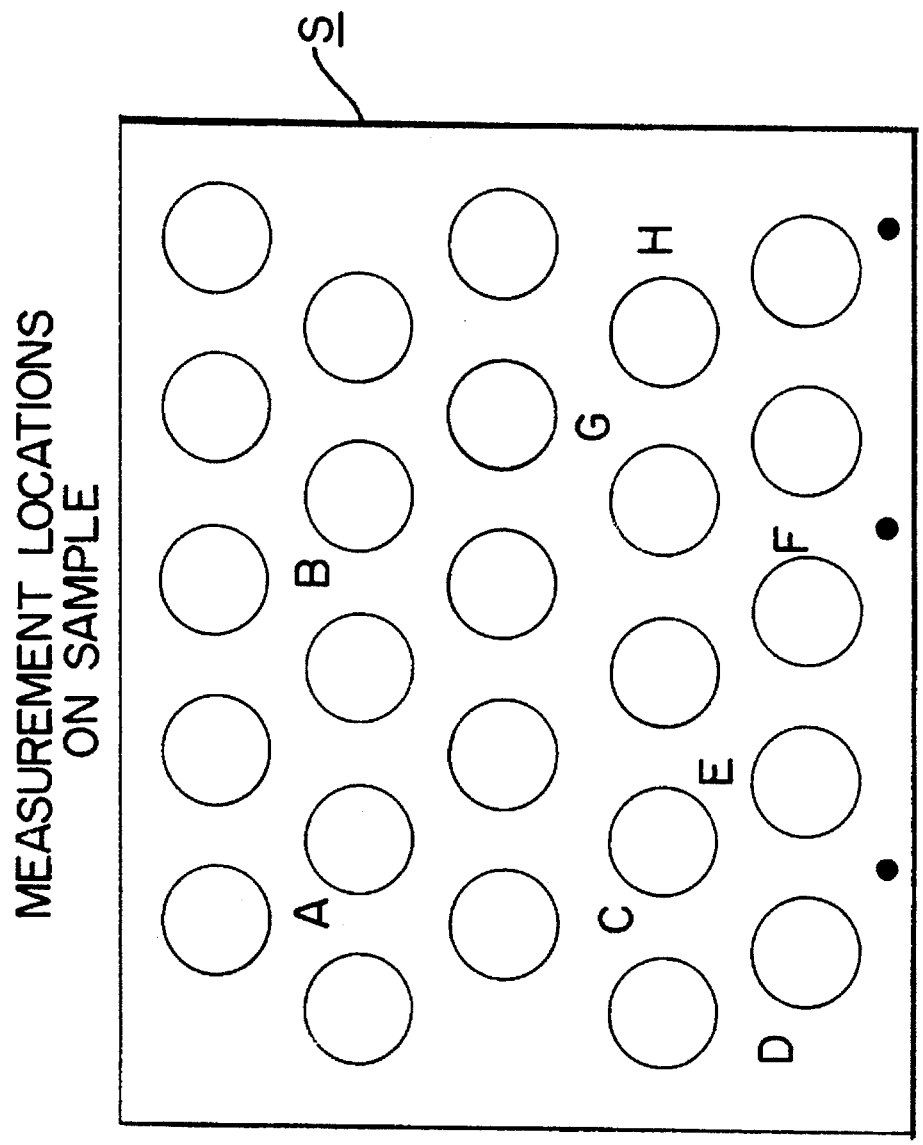
FIG. 1 illustrates a map of measurements taken at several locations designated as A through H of a sample S measuring activity in accordance with the Example.

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art.

As summarized above, the decontamination composition comprises 40 to 60 percent of a compound selected from the group consisting of oxalic acid, alkali metal and ammonium salts of oxalic acid and mixtures thereof; 5 to 20 percent of a compound selected from the group consisting of citric acid, alkali metal and ammonium salts of citric acid and mixtures thereof; 20 to 40 percent of a compound selected from the group consisting of polyaminocarboxylic acid, alkali metal and ammonium salts of polyaminocarboxylic acid and the combination of a polyaminocarboxylic acid and a neutralizing compound, and mixtures thereof; 0 to 2 percent of a nonionic surfactant; 0 to 2 percent of a dispersant; and 0 to 2 percent of a corrosion inhibitor.

The alkali metal and ammonium salts of the oxalic and citric acid can include mono- and disubstituted salts. A particularly preferred salt of oxalic acid is ammonium oxalate. A particularly preferred salt of citric acid is ammonium citrate.

Suitable polyaminocarboxylic acids include ethylenediaminetetraacetic acid, diethylenetriaminepentaacetic acid, triethylenetetraamine hexaacetic acid, N-2-hydroxyethylethylenediaminetriacetic acid, propylene1,2-diaminetetraacetic acid, propylene-1,3-diaminetetraacetic acid, nitrilotriacetic acid, the ammonium and alkali metal salts of said acids, and the combination of the polyaminocarboxylic acids with neutralizing compound, and mixtures thereof. The alkali metal and ammonium salts can include mono- and disubstituted salts. A particularly preferred salt of polyaminocarboxylic acid is diammonium ethylenediaminetetraacetic acid. A suitable neutralizing compound is hydrazine.

Suitable nonionic surfactants include Triton X-100, an octylphenoxy-polyethoxyethanol with 9 to 10 moles of ethylene oxide surfactant, available from Union Carbide, Danbury, Conn., and Pluronic L-101, a polyoxyethylene-polyoxypropylene block polymer surfactant, available from BASF-Wyandotte, Wyandotte, Mich. A suitable dispersant for organic solids is Tamol SN, a sodium salt napthalenesulfonic acid, available from Rohm & Haas, Philadelphia, Pa. A suitable dispersant for inorganic solids is sodium lignosulfonate. A suitable corrosion inhibitor is Rodine 95, which includes thiourea, formaldehyde, o-toluidine and substituted triazine hydrochloric acid, available from Parker+Amchem, Madison Heights, Mich.

In operation, a surface (i.e., a metal surface) contaminated with NORM is contacted with the above-described decontamination compound. The contacting can be conducted at a temperature of about 20° to 150° C., and preferably is conducted at about 80° to 100° C. Agitation in any form (e.g., mechanical or ultrasonic) will increase the rate of removal.

The foregoing example is illustrative of the present invention, and is not to be construed as limiting thereof.

EXAMPLE

The following decontamination composition is blended together:

| Component | Percent by Weight |
|---|---|
| Ammonium Oxalate | 54.52 |
| Diammonium EDTA | 32.72 |
| Ammonium Citrate | 11.45 |
| Triton X-100 | 0.13 |
| Pluronic L-101 | 0.13 |
| Tamol SN | 1.00 |
| Rodine 95 | 0.05 |

A sample S to be decontaminated is a perforated steel plate from an oil refinery distillation tower contaminated with NORMs. The sample is immersed in a bath of the decontamination composition and agitated. The bath temperature is about 95° C. The sample is rinsed in a solution of ESI 635™ available from Environmental Scientific, Inc., Research Triangle Park, N.C., to disperse loose particulate.

Figure 2:
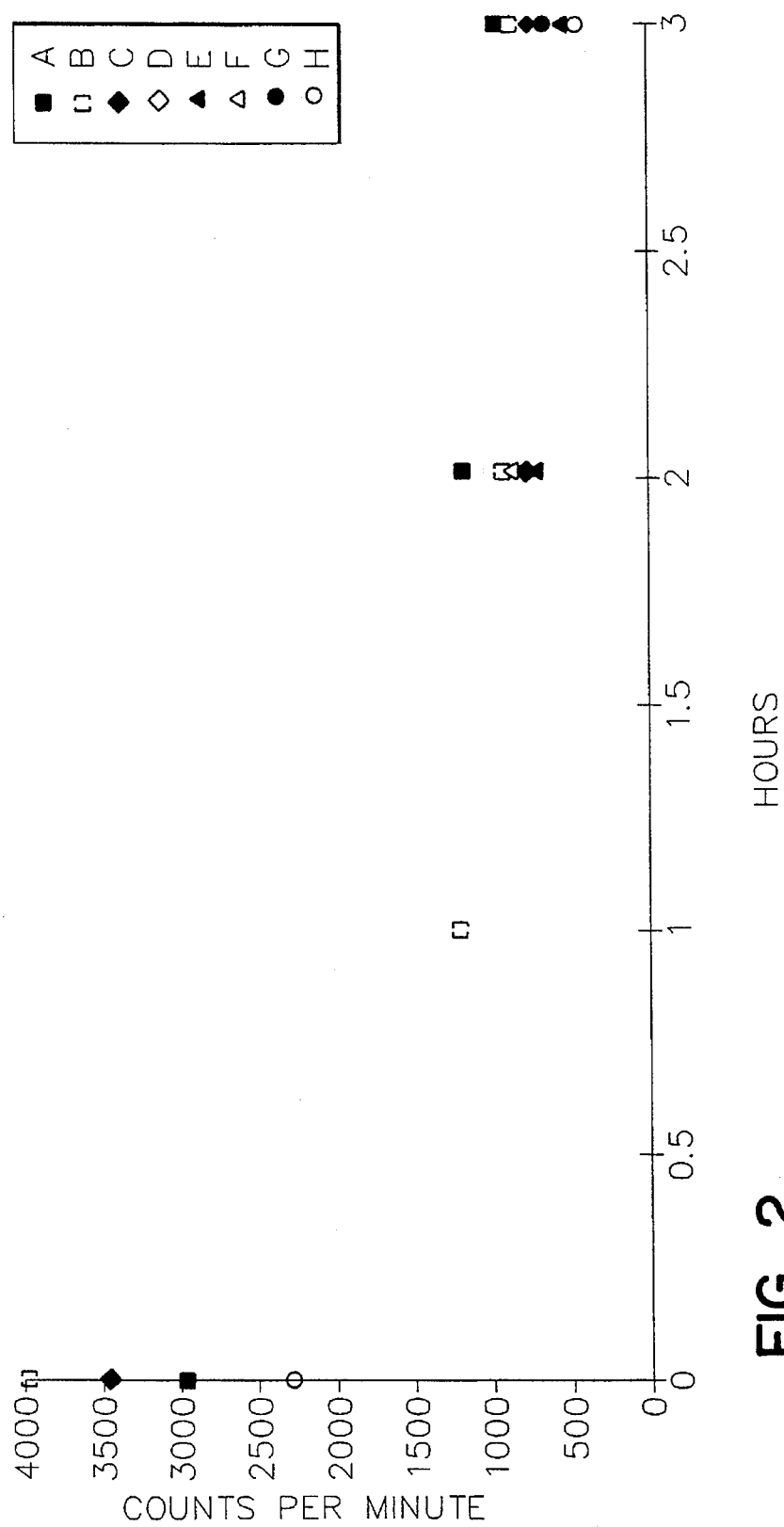
FIG. 2 is a graph of counts per minute versus time in accordance with the Example.

The activity on the sample is measured using a Ludlum Model 2 survey meter available from Ludlum Measurement, Inc., Sweetwater, Tex., with a Model 44-9 pancake probe, and is mapped at several locations designated as A through H which appear to give the highest reading (see FIG. 1). Corresponding measurement are taken at one hour intervals. Referring to FIG. 2 and Table 1, the activity decreases rapidly in the first hour and gradually approaches zero. At three hours, the activity level is only about 18 percent of the initial level.

TABLE 1

| Location | cpm vs. time in hours | | | |
|---|---|---|---|---|
| | 0 | 1 hr | 2 hrs | 3 hrs |
| A | 4000 | | 1150 | 900 |
| B | 4000 | 1200 | 900 | 800 |
| C | 3500 | | 750 | 690 |
| D | 3000 | | 690 | 450 |
| E | 3000 | | 700 | 500 |
| F | 2800 | | 850 | 425 |
| G | 3000 | | | 600 |
| H | 2300 | | | 400 |

In the specification and example, there have been disclosed preferred embodiments of the invention. Although specific terms are employed, they are used in a generic and descriptive sense only and not for the purpose of limitation, the scope of the invention being defined by the following claims.

That which is claimed is:

1. A composition suitable for decontaminating a surface contaminated with NORM, the composition comprising about 40 to 60 percent of a compound selected from the group consisting of oxalic acid, alkali metal and ammonium salts of oxalic acid and mixtures thereof; about 5 to 20 percent of a compound selected from the group consisting of citric acid, alkali metal and ammonium salts of citric acid and mixtures thereof; about 20 to 40 percent of a compound selected from the group consisting of polyaminocarboxylic acid, alkali metal and ammonium salts of polyaminocarboxylic acid and the combination of a polyaminocarboxylic acid and a neutralizing compound, and mixtures thereof; about 0 to 2 percent of a nonionic surfactant; about 0 to 2 percent of a dispersant; and about 0 to 2 percent of a corrosion inhibitor.

2. The composition according to claim 1 wherein the polyaminocarboxylic acid is selected from the group consisting of ethylenediaminetetraacetic acid, diethylenetriaminepentaacetic acid, triethylenetetraaminehexaacetic acid, N-2-hydroxyethylethylenediaminetriacetic acid, propylene-1,2-diaminetetraacetic acid, propylene-1,3-diaminetetraacetic acid, nitrilotriacetic acid, the ammonium and alkali metal salts of said acids, and the combination of said acids with neutralizing compounds, and mixtures thereof.

3. The composition according to claim 1 wherein the salt of citric acid is ammonium citrate.

4. The composition according to claim 1 wherein the salt of oxalic acid is ammonium oxalate.

5. The composition according to claim 1 wherein the salt of polyaminocarboxylic acid is diammonium ethylenediaminetetraacetic acid.

6. A method of decontaminating a surface whereby NORM contaminants are removed from the surface, the method comprising contacting the surface surface with a decontamination composition comprising about 40 to 60 percent of a compound selected from the group consisting of oxalic acid, alkali metal and ammonium salts of oxalic acid and mixtures thereof, about 5 to 20 percent of a compound selected from the group consisting of citric acid, alkali metal and ammonium salts of citric acid and the combination of a polyaminocarboxylic acid and a neutralizing amine, and mixtures thereof, about 20 to 40 percent of a compound selected from the group consisting of polyaminocarboxylic acid, alkali metal and ammonium salts of polyaminocarboxylic acid and mixtures thereof, about 0 to 2 percent of a nonionic surfactant; about 0 to 2 percent of a dispersant; and about 0 to 2 percent of a corrosion inhibitor.

7. The method according to claim 6 wherein the polyaminocarboxylic acid is selected from the group consisting of ethylenediamine tetraacetic acid, diethylenetriamine pentaaceticacid, triethylene tetraamine hexaacetic acid, N-2-hydroxyethylethylene diaminetriacetic acid, propylene-1,2-diaminetetraacetic acid, propylene-1,3-diaminetetraacetic acid, nitrilo triacetic acid, the ammonium and alkali metal salts of said acids, and the combination of said acids with a neutralizing compound, and mixtures thereof.

8. The method according to claim 6 wherein the salt of citric acid is ammonium citrate.

9. The method according to claim 6 wherein the salt of oxalic acid is ammonium oxalate.

10. The method according to claim 6 wherein the salt of the polyaminocarboxylic acid is diammoniumethylenediaminetetraacetic acid.

11. A method of decontaminating a metal surface having a NORM-contamination film containing radon and its decay products thereon whereby the NORM contaminants are removed by contacting the metal surface with a decontamination composition comprising about 40 to 60 percent of a compound selected from the group consisting of oxalic acid, alkali metal and ammonium salts of oxalic acid and mixtures thereof, about 5 to 20 percent of a compound selected from the group consisting of citric acid, alkali metal and ammonium salts of citric acid and the combination of a polyaminocarboxylic acid and a neutralizing amine, and mixtures thereof, about 20 to 40 percent of a compound selected from the group consisting of polyaminocarboxylic acid, alkali metal and ammonium salts of polyaminocarboxylic acid and mixtures thereof, about 0 to 2 percent of a nonionic surfactant; about 0 to 2 percent of a dispersant; and about 0 to 2 percent of a corrosion inhibitor.

12. The method according to claim 11 wherein the polyaminocarboxylic acid is selected from the group consisting of ethylenediamine tetraacetic acid, diethylenetriamine pentaaceticacid, triethylene tetraamine hexaacetic acid, N-2-hydroxyethylethylene diaminetriacetic acid, propylene-1,2-diaminetetraacetic acid, propylene-1,3-diaminetetraacetic acid, nitrilo triacetic acid, the ammonium and alkali metal salts of said acids, and the combination of said acids with a neutralizing compound, and mixtures thereof.

13. The method according to claim 11 wherein the salt of citric acid is ammonium citrate.

14. The method according to claim 11 wherein the salt of oxalic acid is ammonium oxalate.

15. The method according to claim 11 wherein the salt of the polyaminocarboxylic acid is diammoniumethylenediamine-tetraacetic acid.

* * * * *